(12) United States Patent
Kanzaki

(10) Patent No.: US 10,534,158 B2
(45) Date of Patent: Jan. 14, 2020

(54) WIDE ANGLE LENS

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 6 days.

(21) Appl. No.: 15/719,574

(22) Filed: Sep. 29, 2017

(65) Prior Publication Data
US 2018/0095245 A1   Apr. 5, 2018

(30) Foreign Application Priority Data

Sep. 30, 2016 (JP) .................................. 2016-194139
Dec. 26, 2016 (JP) .................................. 2016-251165

(51) Int. Cl.
G02B 9/64 (2006.01)
G02B 13/00 (2006.01)
G02B 13/06 (2006.01)

(52) U.S. Cl.
CPC ........... *G02B 9/64* (2013.01); *G02B 13/0005* (2013.01); *G02B 13/06* (2013.01)

(58) Field of Classification Search
CPC . G02B 9/62; G02B 9/64; G02B 13/02; G02B 13/04; G02B 13/0045; G02B 13/005; G02B 13/006
USPC ........ 359/708, 713, 745, 749–752, 761, 762
See application file for complete search history.

(56) References Cited

U.S. PATENT DOCUMENTS

| | | | | |
|---|---|---|---|---|
| 8,331,041 B2* | 12/2012 | Katakura | ............... | G02B 13/06 359/751 |
| 9,523,841 B1* | 12/2016 | Chen | ................. | G02B 13/0045 |
| 2008/0074761 A1 | 3/2008 | Yamakawa et al. | | |
| 2015/0286037 A1* | 10/2015 | Ono | ...................... | G02B 13/04 359/749 |
| 2016/0077313 A1 | 3/2016 | Komiyama | | |

(Continued)

FOREIGN PATENT DOCUMENTS

| CN | 104793316 | 7/2015 |
|---|---|---|
| CN | 105452928 | 3/2016 |

(Continued)

OTHER PUBLICATIONS

"Search Report of Europe Counterpart Application", dated Feb. 20, 2018, p. 1-9.

(Continued)

*Primary Examiner* — Darryl J Collins
(74) *Attorney, Agent, or Firm* — JCIPRNET

(57) ABSTRACT

A wide angle lens includes a first lens, a second lens, a third lens, a fourth lens, a diaphragm, a fifth lens, a sixth lens and a seventh lens which are disposed in order from an object side. The first, second, third and sixth lenses are negative meniscus lenses, and the fourth, fifth and seventh lenses are positive lenses. The fifth lens is a glass lens, and the second, third, fourth, sixth and seventh lenses are plastic lenses. The sixth lens and the seventh lens constitute a cemented lens. When a center curvature radius on an image side face of the fifth lens is R52 and a focal length of an entire wide angle lens is f0, the center curvature radius R52 and the focal length f0 satisfy the following conditional expression:

$2 \times f0 \leq |R52| \leq 5 \times f0$.

7 Claims, 15 Drawing Sheets

(56) References Cited

U.S. PATENT DOCUMENTS

2016/0187617 A1 6/2016 Komiyama
2018/0203211 A1* 7/2018 Kim .................. G02B 13/06

FOREIGN PATENT DOCUMENTS

| EP | 1903368 | 3/2008 |
| JP | 2011107425 | 6/2011 |
| JP | 4947700 | 6/2012 |

OTHER PUBLICATIONS

"Office Action of China Counterpart Application," with English translation thereof, dated Sep. 3, 2019, pp. 1-15.

* cited by examiner

WIDE ANGLE LENS

CROSS REFERENCE TO RELATED APPLICATION

The present invention claims priority under 35 U.S.C. § 119 to Japanese Application No. 2016-194139 filed Sep. 30, 2016, and Japanese Application No. 2016-251165 filed Dec. 26, 2016, the entire contents of which are incorporated herein by reference.

FIELD OF THE INVENTION

The present invention relates to a wide angle lens which is mounted on a vehicle or the like.

BACKGROUND

A wide angle and a high resolution are required in a wide angle lens which is used in an application for capturing images in a vehicle or the like. Further, stable temperature characteristics are also required. When a wide angle lens is constituted of plastic lenses, sufficient temperature characteristics cannot be obtained and, when a wide angle lens is constituted of glass lenses, although temperature characteristics can be improved, its component costs are increased.

On the other hand, a wide angle lens has been proposed in which a first lens, a second lens, a third lens, a diaphragm, a fourth lens, a fifth lens and a sixth lens are disposed in this order from an object side, and the second lens, the third lens and the fourth lens are plastic lenses, and the first lens, the fifth lens and the sixth lens are glass lenses (see Japanese Patent No. 4947700).

A wide angle lens mounted on a vehicle or the like is required to have stable characteristics over a wide temperature range so as to be capable of coping with ambient temperature. However, in the wide angle lens described in the Patent Literature, the third lens and the fourth lens disposed on both sides of the diaphragm are plastic lenses and thus stable characteristics cannot be obtained over a wide temperature range.

SUMMARY

In view of the problem described above, the present invention provides a wide angle lens which is capable of obtaining stable characteristics over a wide temperature range while using a plastic lens and a glass lens. In other words, the present invention provides a wide angle lens which is capable of obtaining stable characteristics over a wide temperature range while using plastic lenses.

The present invention provides a wide angle lens comprising a first lens, a second lens, a third lens, a fourth lens, a diaphragm, a fifth lens, a sixth lens and a seventh lens which are disposed in order from an object side. The first lens is a negative meniscus lens whose convex surface is directed to the object side, the second lens is a negative meniscus lens whose convex surface is directed to the object side, the third lens is a negative meniscus lens whose concave surface is directed to the object side, the fourth lens is a positive lens whose convex surfaces are directed to the object side and an image side, the fifth lens is a positive lens whose convex surfaces are directed to the object side and the image side, the sixth lens is a negative lens whose concave surface is directed to the image side, and the seventh lens is a positive lens whose convex surfaces are directed to the object side and an image side. The fifth lens is a glass lens, the second lens, the third lens, the fourth lens, the sixth lens and the seventh lens are plastic lenses, the sixth lens and the seventh lens constitute a cemented lens which is constituted so that an image side face of the sixth lens and an object side face of the seventh lens are joined to each other with an adhesive and, when a center curvature radius on an image side face of the fifth lens is "R52" and a focal length of an entire wide angle lens is "f0", the center curvature radius "R52" and the focal length "f0" satisfy the following conditional expression:

$$2 \times f0 \leq |R52| \leq 5 \times f0.$$

In the present invention, a plastic lens and a glass lens are used together and thus the cost can be reduced in comparison with a case that the entire wide angle lens is constituted of glass lenses. Further, one (fifth lens) of the lenses (fourth lens and fifth lens) disposed on both sides of a diaphragm is a glass lens and thus the temperature characteristic can be improved. Further, the center curvature radius "R52" of the image side face of the fifth lens and the focal length "f0" of the entire wide angle lens satisfy the following conditional expression:

$$2 \times f0 \leq |R52| \leq 5 \times f0.$$

Therefore, an angle formed by the outermost light of a light flux and an image side face of the fifth lens is close to a right angle. Accordingly, a moving amount of a focal point when the temperature is varied can be reduced and a variation amount of a viewing angle when the temperature is varied can be reduced. As a result, a stable characteristic can be obtained over a wide temperature range.

In the present invention, it may be adopted that, when a center curvature radius on an object side face of the fifth lens is "R51", the center curvature radii "R51" and "R52" satisfy the following conditional expression:

$$|R51| \geq |R52|.$$

According to this structure, various aberrations can be corrected appropriately.

In the present invention, it may be adopted that the first lens is a glass lens. According to this structure, the object side face of the first lens which is located on the outermost side is hard to be scratched.

In the present invention, it may be adopted that, when a center thickness of the seventh lens is "T7" and a peripheral thickness of a light effective area on an object side face of the seventh lens is "C7", the center thickness "T7" and the peripheral thickness "C7" satisfy the following conditional expression:

$$2 \leq (T7/C7) \leq 3.$$

In a case that the first lens is a glass lens, as the Abbe number becomes larger, the magnification chromatic aberration can be basically reduced. However, in a case that the Abbe number is large, the refractive index becomes small and thus an effective diameter of the first lens is required to be increased. Even in this case, there may be a case that an effective diameter of the first lens is required to reduce due to a restriction of an outer diameter dimension of the lens unit and, in this case, the chromatic aberration becomes large. On the other hand, even in a case that the first lens is a glass lens and its effective diameter is small (outer diameter is small), when the center thickness "T7" and the peripheral thickness "C7" of the seventh lens satisfy the following conditional expression, the chromatic aberration can be corrected appropriately.

$$2 \leq (T7/C7) \leq 3.$$

In the present invention, it may be adopted that an Abbe number "v6" of the sixth lens and an Abbe number "v7" of the seventh lens satisfy the following conditional expression:

$\xi 6 \leq 30$, and $v7 \geq 50$.

According to this structure, the chromatic aberration can be corrected appropriately.

In the present invention, it may be adopted that an object-image distance "D" and the focal length "f0" satisfy the following conditional expression:

$8 < D/f0 < 15$.

According to this structure, corrections of the spherical aberration and the distortion aberration can be performed easily and a dimension (object-image distance) in the optical axis direction of the wide angle lens can be shortened.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of a wide angle lens to which the present invention is applied will be described below with reference to the accompanying drawings. In the following descriptions, "La" is indicated on an object side and "Lb" is indicated on an image side in a direction where an optical axis "L" is extended.

First Embodiment (Entire Constitution)

Figure 1:
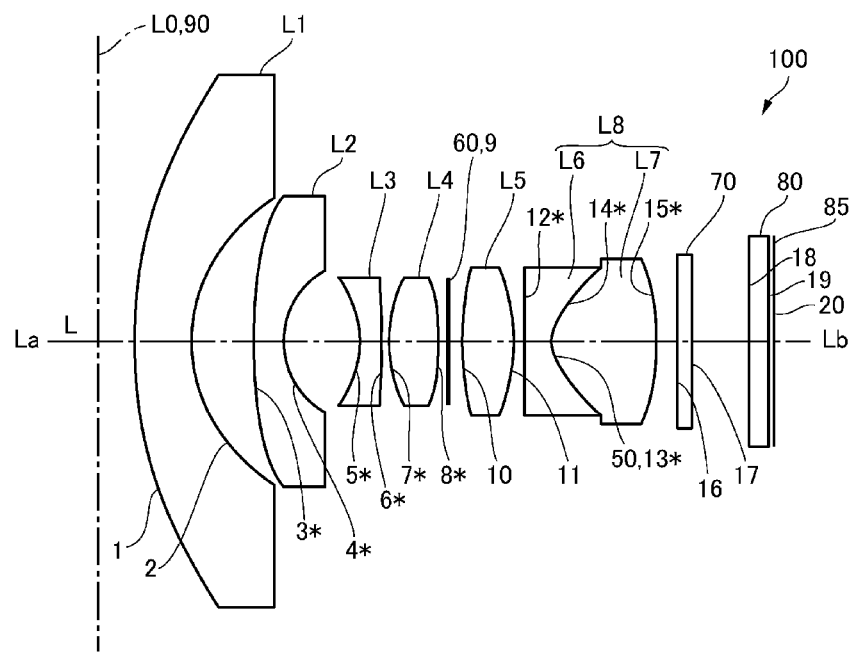
FIG. 1 is an explanatory view showing a constitution of a wide angle lens in accordance with a first embodiment of the present invention.

FIG. 1 is an explanatory view showing a constitution of a wide angle lens 100 in accordance with a first embodiment of the present invention. Table 1 indicates lens data of the wide angle lens 100 in accordance with the first embodiment of the present invention. Regarding indication of respective faces 1 through 18 in FIG. 1, the mark "*" is added to an aspherical surface. Further, in upper columns in Table 1, a center curvature radius, a thickness, a refractive index "nd", an Abbe number "vd", a conical coefficient "K", and a linear expansion coefficient of each of the faces are indicated, and units of a center curvature radius and a thickness are "mm". In a case that a lens face is a convex surface which is protruded toward the object side "La" or a concave surface which is recessed toward the object side "La", a center curvature radius is expressed as a positive value and, in a case that a lens face is a convex surface which is protruded toward the image side "Lb" or a concave surface which is recessed toward the image side "Lb", the center curvature radius is expressed as a negative value. Further, in lower columns in Table 1, aspherical coefficients A4, A6, A8, A10, . . . are indicated when a shape of an aspherical surface is expressed in an equation described below (Equation 1).

TABLE 1

| # | Member | Center Curvature Radius | Thickness | Radius | Conical Coefficient K | Linear Expansion Coefficient [×10^−6] | Refractive Index nd | Abbe Number v d |
|---|---|---|---|---|---|---|---|---|
| 0 |  | Infinity | Infinity | 0.000 |  | 0.0 |  |  |
| 1 | L1 | 12.317 | 1.300 | 6.749 |  | 60.0 | 1.835 | 42.720 |

TABLE 1-continued

| # | | | | | | | | |
|---|---|---|---|---|---|---|---|---|
| 2 | | 4.161 | 1.661 | 3.662 | | 26.0 | | |
| 3 | L2 | 20.840 | 0.610 | 3.662 | 0 | 62.0 | 1.512 | 56.300 |
| 4 | | 1.948 | 1.986 | 1.839 | 0 | 62.0 | | |
| 5 | L3 | −2.093 | 0.600 | 1.648 | 0 | 62.0 | 1.544 | 56.190 |
| 6 | | −9.947 | 0.080 | 1.498 | 0 | 62.0 | | |
| 7 | L4 | 4.111 | 1.265 | 1.464 | 0 | 62.0 | 1.583 | 30.181 |
| 8 | | −4.464 | 0.229 | 1.202 | 0 | 62.0 | | |
| 9 | Diaphragm | Infinity | 0.392 | 1.022 | | 26.0 | | |
| 10 | L5 | 8.503 | 1.400 | 2.000 | | 70.0 | 1.729 | 54.670 |
| 11 | | −4.215 | 0.152 | 2.000 | | 26.0 | | |
| 12 | L6 | 75.542 | 0.600 | 1.643 | 0 | 66.0 | 1.636 | 23.970 |
| 13 | Adhesive | 1.363 | 0.010 | 1.795 | −8.02400E−01 | 60.0 | 1.486 | 56.090 |
| 14 | L7 | 1.363 | 2.819 | 1.804 | −8.02400E−01 | 62.0 | 1.544 | 56.190 |
| 15 | | −3.897 | 0.126 | 2.033 | 0 | 26.0 | | |
| 16 | Filter | Infinity | 0.300 | | | | 1.517 | 64.160 |
| 17 | | Infinity | 0.700 | | | | | |
| 18 | Cover | Infinity | 0.400 | | | | 1.517 | 64.160 |
| 19 | | Infinity | 0.070 | | | | | |
| 20 | | Infinity | | | | | | |

| # | K4 | K6 | K8 | K10 | K12 |
|---|---|---|---|---|---|
| 3 | 3.79726E−03 | −4.90745E−04 | 3.52452E−05 | −6.14145E−07 | |
| 4 | 1.27788E−03 | −1.62063E−03 | 6.03750E−04 | −3.26393E−04 | |
| 5 | 1.49157E−02 | −6.82759E−04 | 1.57539E−03 | | |
| 6 | 1.31906E−02 | 2.03308E−03 | 7.56879E−04 | | |
| 7 | 1.47098E−02 | 4.61277E−03 | 1.15896E−03 | | |
| 8 | 2.61372E−02 | 1.08066E−03 | 3.80411E−03 | | |
| 12 | −1.34929E−04 | −4.49331E−04 | 5.85001E−05 | | |
| 13 | 1.33408E−02 | −1.02280E−02 | 2.98919E−03 | −1.27710E−04 | −4.14620E−05 |
| 14 | 1.33408E−02 | −1.02280E−02 | 2.98919E−03 | −1.27710E−04 | −4.14620E−05 |
| 15 | 8.99082E−03 | 3.38712E−04 | 4.61115E−04 | −1.98759E−04 | 2.28348E−05 |

In the following equation, a sag amount (axis in the optical axis direction) is "Z", a height perpendicular to the optical axis (light height) is "r", the conical coefficient is "K", and an inverse number of the center curvature radius is "c".

$$Z = \frac{cr^2}{1 + \sqrt{1 - (1+K)c^2 r^2}} + \sum_{n=2}^{5} A_{2n} r^{2n} \quad \text{[Equation 1]}$$

As shown in FIG. 1 and Table 1, the wide angle lens 100 is comprised of a first lens "L1", a second lens "L2", a third lens "L3", a fourth lens "L4", a diaphragm 60, a fifth lens "L5", a sixth lens "L6" and a seventh lens L7, which are disposed in this order from the object side "La". A flat plate-shaped filter 70, a flat plate-shaped cover glass 80 and an imaging element 85 are disposed on the image side "Lb" with respect to the seventh lens "L7". In this embodiment, the wide angle lens 100 is a stereoscopic projection type and the maximum distortion when an ideal image height is a reference is designed so as to be 20% or less in an absolute value.

The wide angle lens 100 is constituted so that the focal length "f0" (Effective Focal Length) of the entire lens system is 1.43 mm, the "F"-value is 2.0, and the object-image distance (Total Track) is 15.5 mm. Further, a vertical viewing angle of the wide angle lens 100 is 141.9° (image height=3.8 mm) and its horizontal viewing angle is 193.8° (image height=4.8 mm).

In FIG. 1 and Table 1, an imaginary plane 90 (image) is assumed to exist on the object side "La" with respect to the first lens "L1" and the imaginary plane 90 is set to be a zeroth face L0. Further, the ninth face 9 is formed by the diaphragm 60. The sixteenth face 16 is formed by a face on the object side "La" of the filter 70, and the seventeenth face 17 is formed by a face on the image side "Lb" of the filter 70. The eighteenth face 18 is formed by a face on the object side "La" of the cover glass 80, and the nineteenth face 19 is formed by a face on the image side "Lb" of the cover glass 80. The twentieth face 20 is formed by an imaging face of the imaging element 85. In this embodiment, a ring-shaped light shielding sheet is disposed between the second lens "L2" and the third lens "L3".

(Lens Constitution)

The first lens "L1" is a negative meniscus lens (meniscus lens having a negative power) whose convex surface (first face 1) is directed to the object side "La" and its concave surface (second face 2) is directed to the image side "Lb". The second lens "L2" is a negative meniscus lens (meniscus lens having a negative power) whose convex surface (third face 3) is directed to the object side "La" and its concave surface (fourth face 4) is directed to the image side "Lb". The third lens "L3" is a negative meniscus lens (meniscus lens having a negative power) whose concave surface (fifth face 5) is directed to the object side "La" and its convex surface (sixth face 6) is directed to the image side "Lb". The fourth lens "L4" is a positive lens (biconvex lens having positive powers) whose convex surfaces (seventh face 7 and eighth face 8) are directed to the object side "La" and the image side "Lb". The fifth lens "L5" is a positive lens (biconvex lens having positive powers) whose convex surfaces (tenth face 10 and eleventh face 11) are directed to the object side "La" and the image side "Lb". The sixth lens "L6" is a negative lens (lens having a negative power) whose concave surface (thirteenth face 13) is directed to the image side "Lb". In this embodiment, the sixth lens "L6" is a negative meniscus lens (meniscus lens having a negative power) whose concave surface (thirteenth face 13) is directed to the image side "Lb" and its convex surface (twelfth face 12) is directed to the object side "La". The seventh lens "L7" is a positive lens (biconvex lens having positive powers) whose convex surfaces (fourteenth face 14 and fifteenth face 15) are directed to the object side "La" and the image side "Lb".

Each of a convex surface (first face 1) on the object side "La" and a concave surface (second face 2) on the image side "Lb" of the first lens "L1" is a spherical surface. Each of a convex surface (third face 3) on the object side "La" and a concave surface (fourth face 4) on the image side "Lb" of the second lens "L2" is an aspherical surface. Each of a concave surface (fifth face 5) on the object side "La" and a convex surface (sixth face 6) on the image side "Lb" of the third lens "L3" is an aspherical surface. Each of a convex surface (seventh face 7) on the object side "La" and a convex surface (eighth face 8) on the image side "Lb" of the fourth lens "L4" is an aspherical surface. Each of a convex surface (tenth face 10) on the object side "La" and a convex surface (eleventh face 11) on the image side "Lb" of the fifth lens "L5" is a spherical surface. Each of a convex surface (twelfth face 12) on the object side "La" and a concave surface (thirteenth face 13) on the image side "Lb" of the sixth lens "L6" is an aspherical surface. Each of a convex surface (fourteenth face 14) on the object side "La" and a convex surface (fifteenth face 15) on the image side "Lb" of the seventh lens "L7" is an aspherical surface. In this embodiment, the sixth lens "L6" and the seventh lens "L7" constitute a cemented lens "L8" in which a concave surface (thirteenth face 13) on the image side "Lb" of the sixth lens "L6" and a convex surface (fourteenth face 14) on the object side "La" of the seventh lens "L7" are joined to each other with an adhesive 50. Therefore, a face on the object side "La" of the adhesive 50 is the thirteenth face 13 (concave surface on the image side "Lb" of the sixth lens "L6").

In this embodiment, the fifth lens "L5" is a glass lens and, among various lens materials, material whose temperature coefficient of a refractive index is varied linearly in a range of −40° C. through +120° C. is used for the fifth lens "L5". The second lens "L2", the third lens "L3", the fourth lens "L4", the sixth lens "L6" and the seventh lens "L7" are plastic lenses made of material such as acrylic-based resin, polycarbonate-based resin or polyolefin-based resin. The first lens "L1" may be either a glass lens or a plastic lens. However, in this embodiment, the first lens "L1" is a glass lens. Therefore, even when a convex surface (first face 1) on the object side of the first lens "L1" located on the outermost side is exposed, the first lens "L1" is hard to be scratched.

(Detailed Constitution of Lenses)

In the wide angle lens 100 of seven lenses in six groups constituted as described above, a center curvature radius "R52" of the convex surface (eleventh face 11) on the image side "Lb" of the fifth lens "L5" is −4.215 mm. Further, the focal length "f0" of the entire wide angle lens 100 (effective focal length) is 1.43 mm. Therefore, the center curvature radius "R52" and the focal length "f0" satisfy the following first conditional expression:

$$(2 \times f0) = 2.86 \leq |R52| = 4.215 \leq (5 \times 10) = 7.15.$$

In this case, the center curvature radius "R52" of the convex surface (eleventh face 11) on the image side "Lb" of the fifth lens "L5" made of a glass lens is not less than (2×f0) and thus molding of glass is easily performed and the lens face is easily formed by polishing.

Further, the center curvature radius "R51" of the convex surface (tenth face 10) on the object side "La" of the fifth lens "L5" is 8.503 mm. Therefore, the center curvature radii "R51" and "R52" satisfy the following second conditional expression:

$$|R51| = 8.503 \geq |R52| = 4.215.$$

Further, the center thickness "T7" of the seventh lens "L7" is 2.819 mm and the peripheral thickness "C7" of a light effective area of the convex surface (fourteenth face 14) on the object side "La" of the seventh lens "L7" is 1.18 mm. Therefore, the center thickness "T7" and the peripheral thickness "C7" satisfy the following third conditional expression:

$$2 \leq (T7/C7) = 2.389 \leq 3.$$

Further, the Abbe number "ν6" of the sixth lens "L6" is 23.970 and the Abbe number "ν7" of the seventh lens "L7" is 56.190. Therefore, the Abbe number "ν6" of the sixth lens "L6" and the Abbe number "ν7" of the seventh lens "L7" satisfy the following fourth conditional expression:

$$\nu 6 \leq 30, \text{ and}$$

$$\nu 7 \geq 50.$$

Therefore, the chromatic aberration can be corrected appropriately.

Further, the object-image distance "D" is 15.5 mm and the focal length "f0" of the entire lens system is 1.43 mm. Therefore, the object-image distance "D" and the focal length "f0" of the entire lens system satisfy the following fifth conditional expression:

$$8 < D/f0 = 10.839 < 15.$$

In this case, the "D/f0" is larger than 8 and thus corrections of the spherical aberration and the distortion aberration can be performed easily. Further, the "D/f0" is less than 15 and thus a dimension (object-image distance) in the optical axis direction of the wide angle lens 100 can be shortened.

(MTF (Modulation Transfer Function) Characteristics)

Figure 2A:
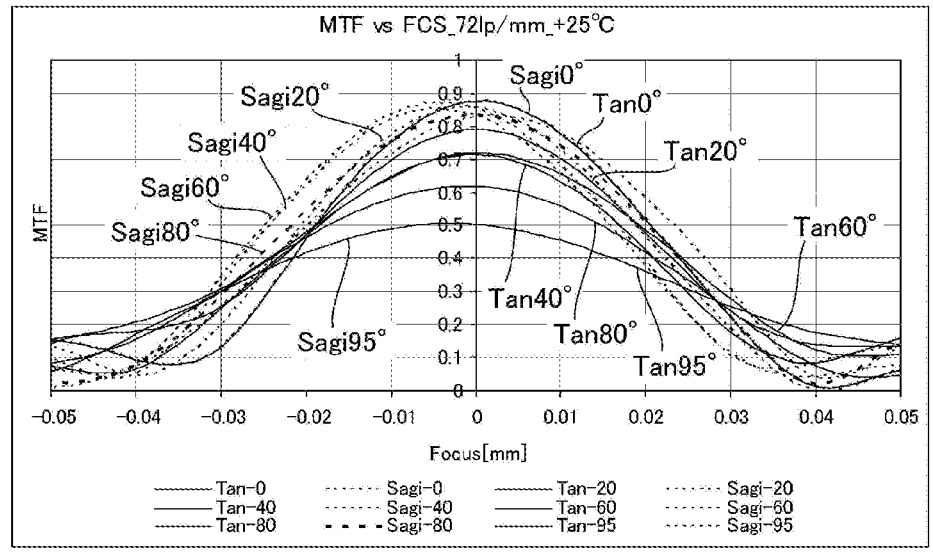
FIGS. 2A and 2B are graphs showing MTF characteristics at +25° C. of a wide angle lens in accordance with a first embodiment of the present invention.
Figure 2B:
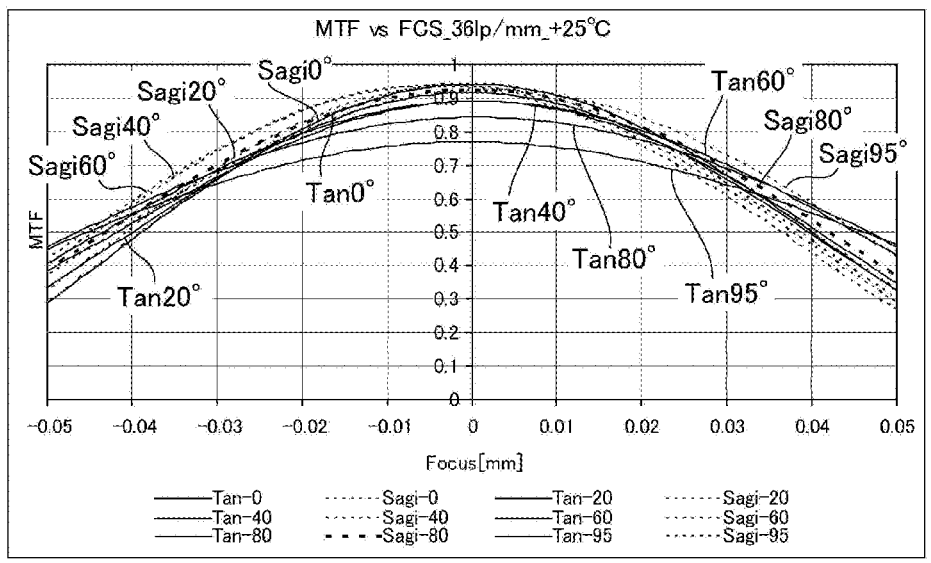
Figure 3A:
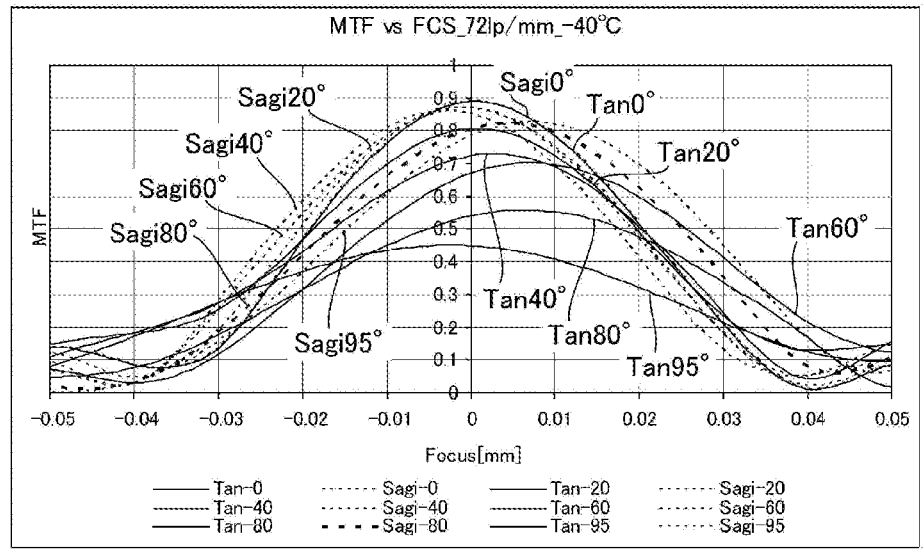
FIGS. 3A and 3B are graphs showing MTF characteristics at −40° C. of a wide angle lens in accordance with a first embodiment of the present invention.
Figure 3B:
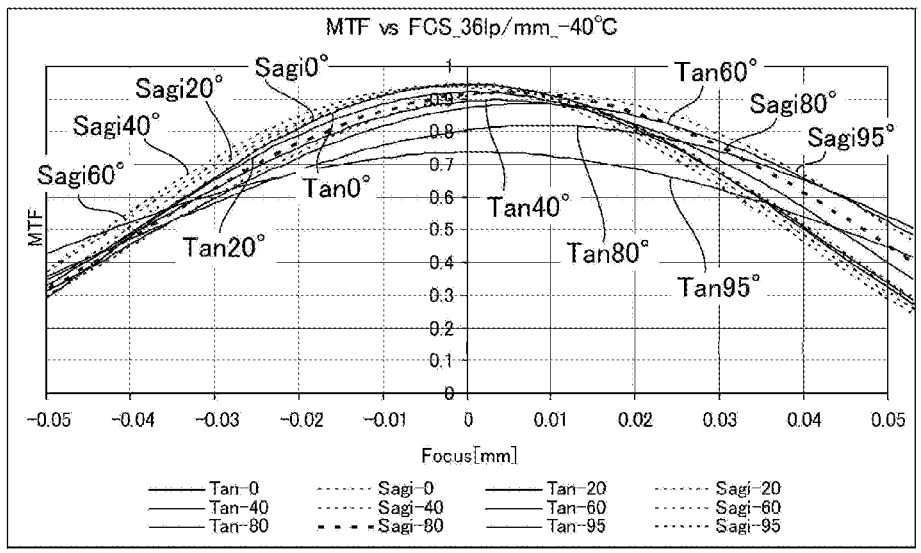
Figure 4A:
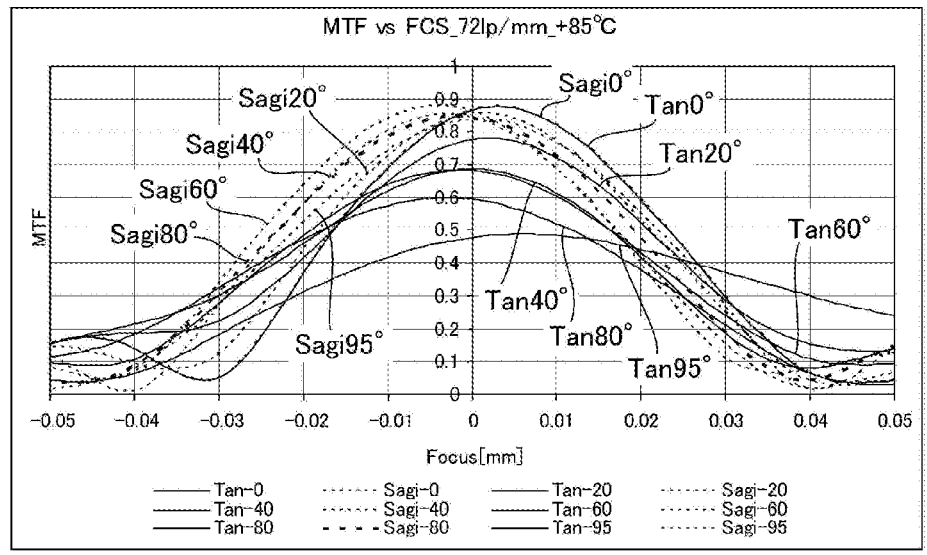
FIGS. 4A and 4B are graphs showing MTF characteristics at +85° C. of a wide angle lens in accordance with a first embodiment of the present invention.
Figure 4B:
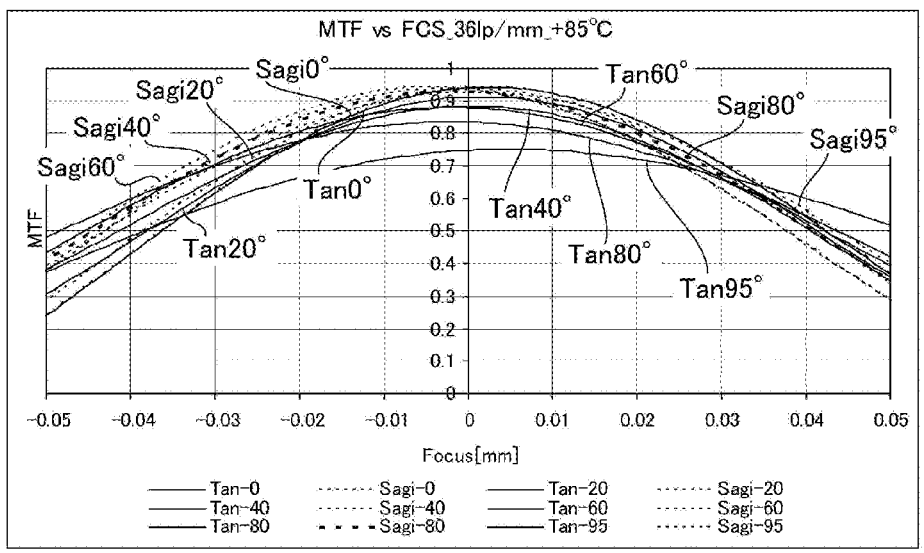

FIGS. 2A and 2B are graphs showing MTF characteristics at +25° C. which is a design reference of the wide angle lens 100 in accordance with the first embodiment of the present invention. FIGS. 3A and 3B are graphs showing MTF characteristics at −40° C. of the wide angle lens 100 in accordance with the first embodiment of the present invention. FIGS. 4A and 4B are graphs showing MTF characteristics at +85° C. of the wide angle lens 100 in accordance with the first embodiment of the present invention. In FIGS. 2A through 4B, MTF characteristics in a frequency of 72 lp/mm are shown in FIGS. 2A, 3A and 4A, and MTF characteristics in a frequency of 36 lp/mm are shown in FIGS. 2B, 3B and 4B. Further, FIGS. 2A through 4B show MTF characteristics in the tangential (Tan) direction and the sagittal (Sagi) direction at viewing angles 0°, 20°, 40°, 60°, 80° and 95°. As shown in FIGS. 2A through 4B, the wide angle lens 100 in this embodiment is provided with a sufficient resolution and a sufficient resolution over a wide temperature range.

(Aberration Characteristics)

Figure 5:
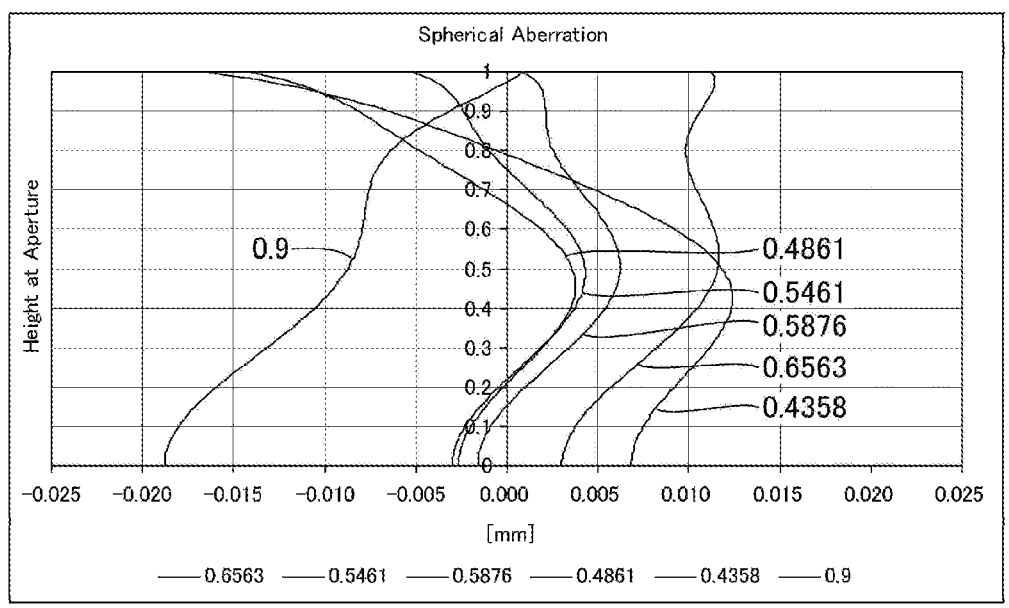
FIG. 5 is a graph showing spherical aberrations of a wide angle lens in accordance with a first embodiment of the present invention.
Figure 6:
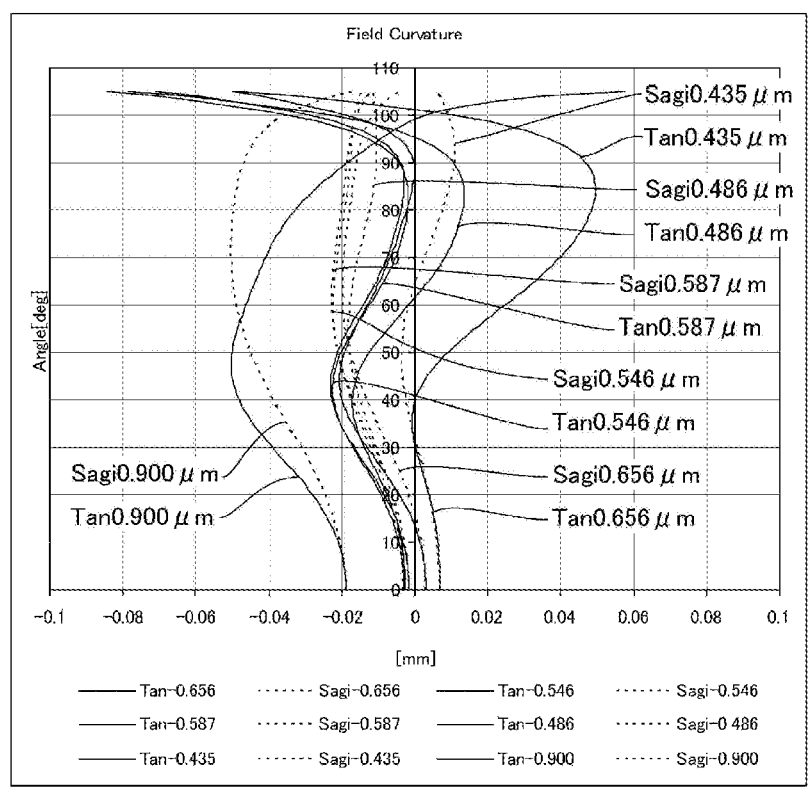
FIG. 6 is a graph showing curvature aberrations of a wide angle lens in accordance with a first embodiment of the present invention.
Figure 7A:
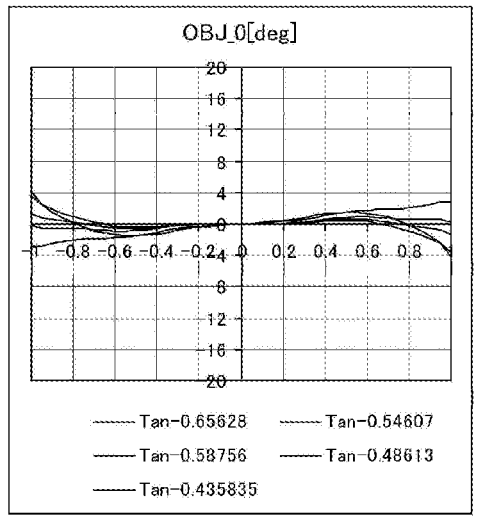
FIGS. 7A through 7D are graphs showing lateral aberrations at 0° C. and +20° C. of a wide angle lens in accordance with a first embodiment of the present invention.
Figure 7B:
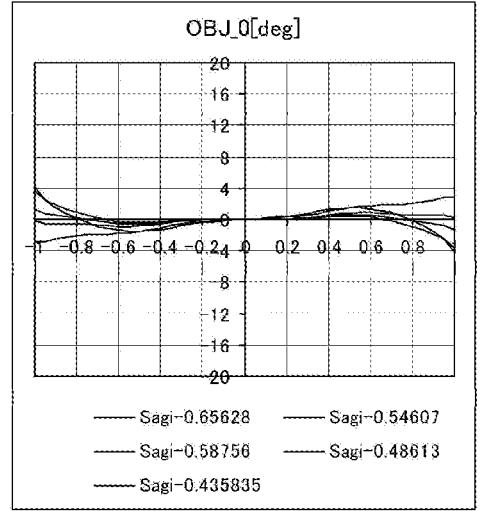
Figure 7C:
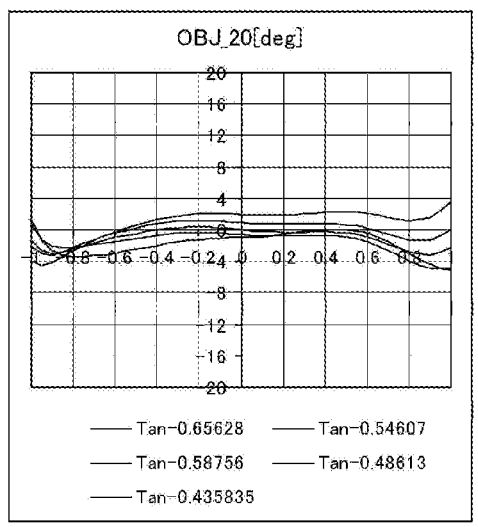
Figure 7D:
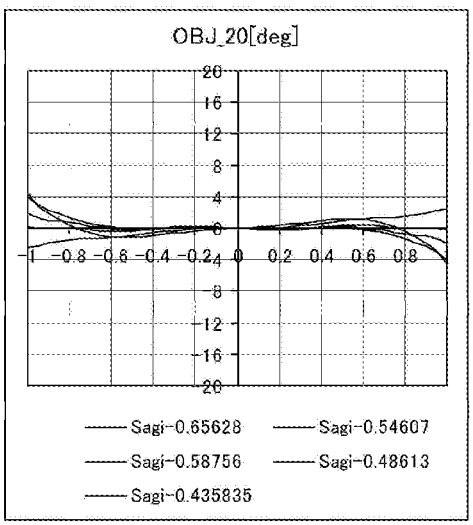
Figure 8A:
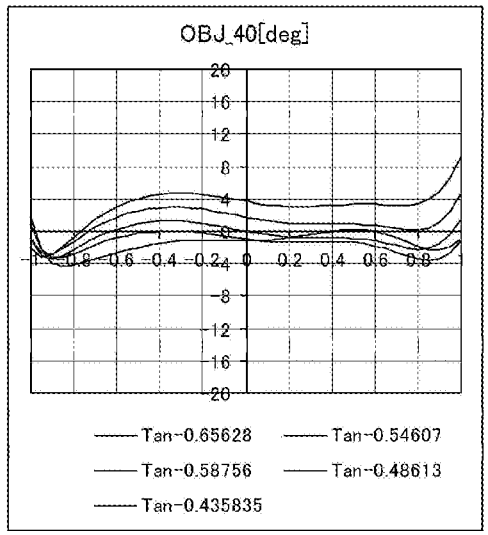
FIGS. 8A through 8D are graphs showing lateral aberrations at +40° C. and +60° C. of a wide angle lens in accordance with a first embodiment of the present invention.
Figure 8B:
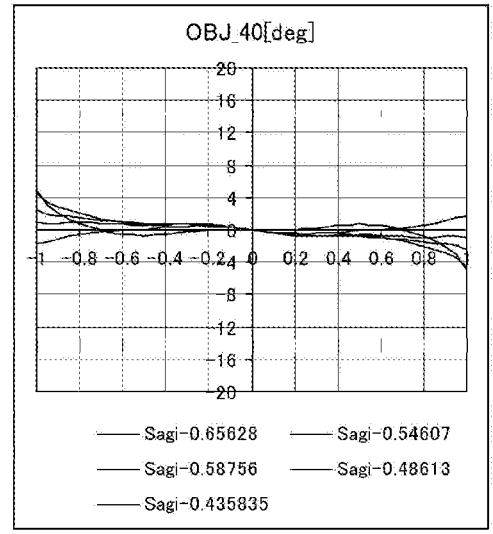
Figure 8C:
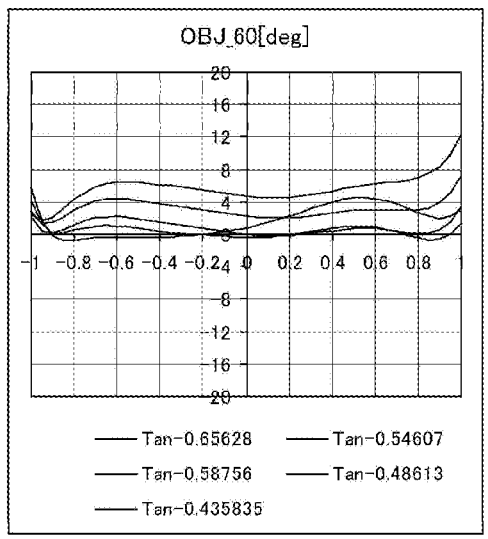
Figure 8D:
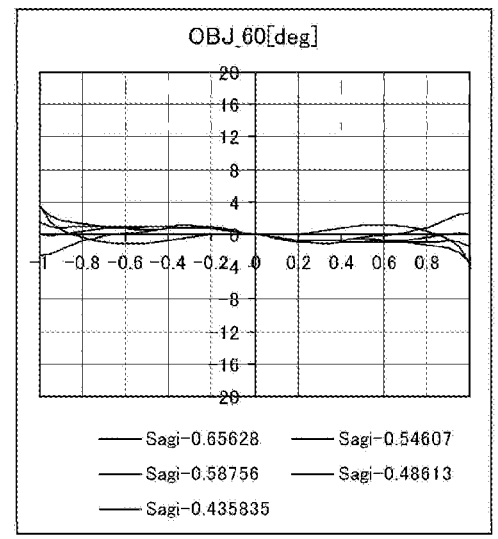
Figure 9A:
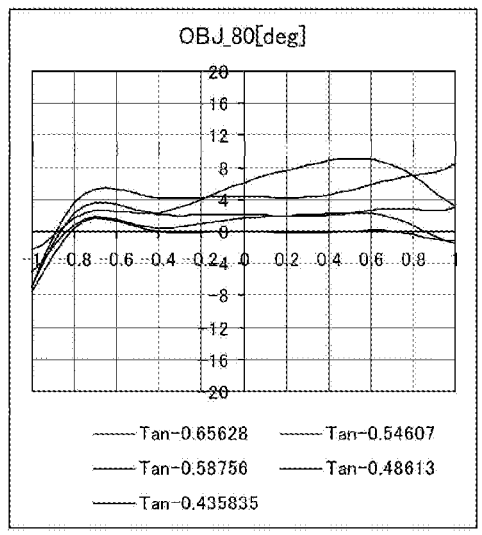
FIGS. 9A through 9D are graphs showing lateral aberrations at +80° C. and +95° C. of a wide angle lens in accordance with a first embodiment of the present invention.
Figure 9B:
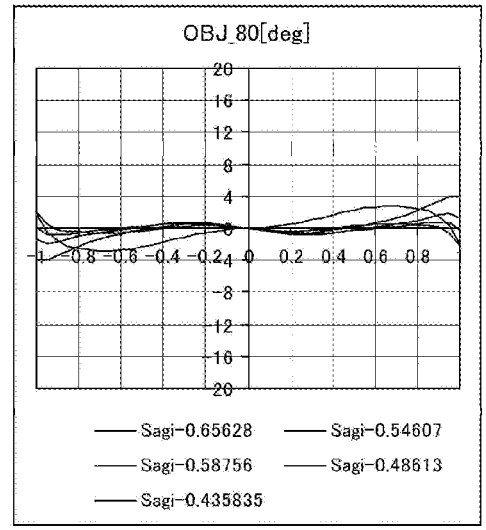
Figure 9C:
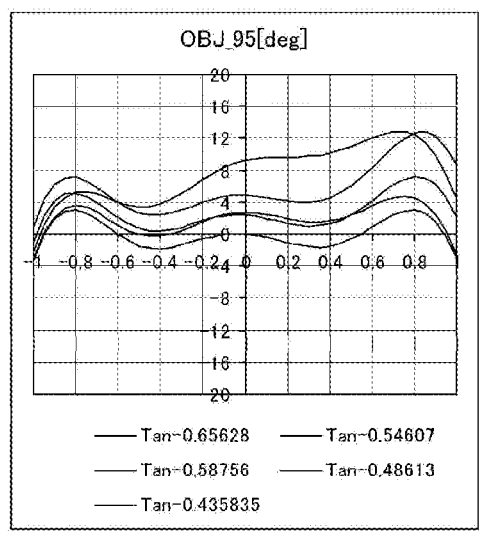
Figure 9D:
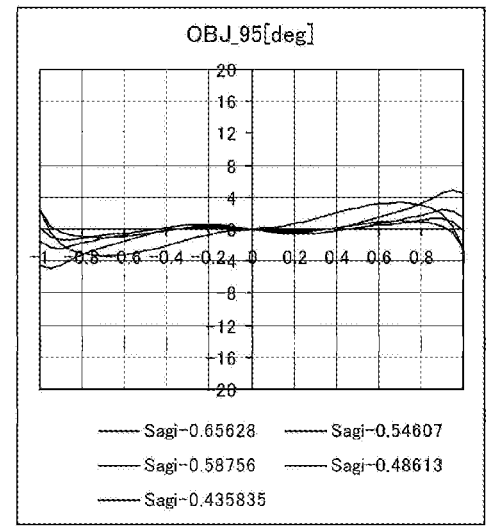

FIG. 5 is a graph showing spherical aberrations of the wide angle lens 100 in accordance with the first embodiment of the present invention. FIG. 6 is a graph showing curvature aberrations of the wide angle lens 100 in accordance with the first embodiment of the present invention. FIGS. 7A through 7D are graphs showing lateral aberrations at 0° C. and +20° C. of the wide angle lens 100 in accordance with the first embodiment of the present invention. FIGS. 8A through 8D are graphs showing lateral aberrations at +40° C. and +60° C. of the wide angle lens 100 in accordance with the first embodiment of the present invention. FIGS. 9A through 9D are graphs showing lateral aberrations at +80° C. and +95° C. of the wide angle lens 100 in accordance with the first embodiment of the present invention. FIG. 5 shows spherical aberrations in lights in a wavelength range from 0.4358 μm to 0.9 μm. FIG. 6 shows curvature aberrations in a tangential (Tan) direction and a sagittal (Sagi) direction in lights in a wavelength range from 0.435 μm to 0.9 μm. FIGS. 7A through 9D collectively show lateral aberrations in a tangential (Tan) direction and a sagittal (Sagi) direction in lights in a wavelength range from 0.435835 μm to 0.65628 μm.

As shown in FIGS. 5 through 7D, the wide angle lens 100 in this embodiment is provided with practically sufficient characteristics in the spherical aberration, the curvature aberration and the lateral aberration. Further, as shown in FIGS. 7A through 9D, the wide angle lens 100 in this embodiment is provided with practically sufficient lateral aberration characteristics in a temperature range from 0° C. to +95° C.

(Temperature Characteristic of Viewing Angle)

Figure 10:
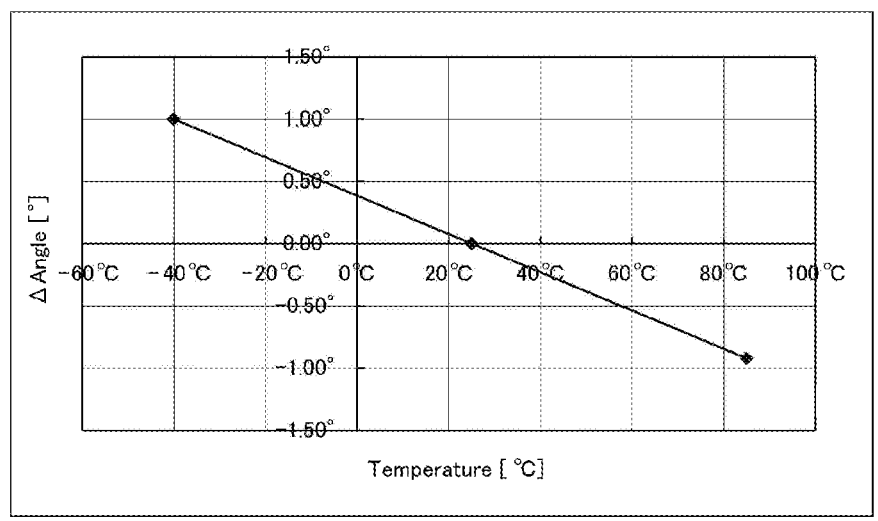
FIG. 10 is a graph showing a viewing angle-temperature characteristic of a wide angle lens in accordance with a first embodiment of the present invention.

FIG. 10 is a graph showing a viewing angle-temperature characteristic of the wide angle lens 100 in accordance with the first embodiment of the present invention. As shown in FIG. 10, in the wide angle lens 100 in this embodiment, a variation of a viewing angle is small over a wide temperature range from −40° C. to +85° C.

(Principal Effects in this Embodiment)

As described above, in the wide angle lens 100 in this embodiment, five plastic lenses and two glass lenses are used together and thus, in comparison with a case that all lenses are glass lenses, the cost can be reduced. Further, one (fifth lens "L5") of the lenses (fourth lens "L4" and fifth lens "L5") disposed on both sides of the diaphragm 60 is a glass lens and thus the temperature characteristics can be improved. Further, the center curvature radius "R52" of the convex surface (eleventh face 11) on the image side "Lb" of the fifth lens "L5" and the entire focal length "f0" satisfy the first conditional expression and thus an angle formed by the outermost light of a light flux and the convex surface (eleventh face 11) on the image side "Lb" of the fifth lens "L5" is close to a right angle. Therefore, a moving amount of a focal point when the temperature is varied can be reduced and a variation amount of a viewing angle when the temperature is varied can be reduced. Accordingly, a stable characteristic can be obtained over a wide temperature range.

Further, the center curvature radius "R51" of the convex surface (the tenth face 10) on the object side "La" of the fifth lens "L5" and the center curvature radius "R52" of the convex surface (eleventh face 11) on its image side "Lb" satisfy the second conditional expression and thus various aberrations can be corrected appropriately.

Further, in this embodiment, a lens whose refractive index is large is used as the first lens "L1". However, even when the refractive index of the first lens "L1" is set to be smaller for further reducing the chromatic aberration, the center thickness "T7" of the seventh lens "L7" and the peripheral thickness "C7" of a light effective area of the face on the object side "La" of the seventh lens "L7" are set to satisfy the third conditional expression so as to be capable of reducing the magnification chromatic aberration effectively. In other words, since the first lens "L1" is a glass lens, as the Abbe number becomes larger, the magnification chromatic aberration can be basically reduced. However, in a case that the Abbe number is large, the refractive index becomes small and thus an effective diameter of the first lens "L1" is required to be increased. On the other hand, there may be a case that an effective diameter of the first lens "L1" is required to reduce due to a restriction of an outer diameter dimension of the lens unit and, in this case, the radius of curvature of the first lens "L1" is required to make small. As a result, although the magnification chromatic aberration becomes large, when the center thickness "T7" and the peripheral thickness "C7" of the seventh lens "L7" satisfy the third conditional expression, the chromatic aberration can be corrected appropriately.

Second Embodiment

Figure 11A:
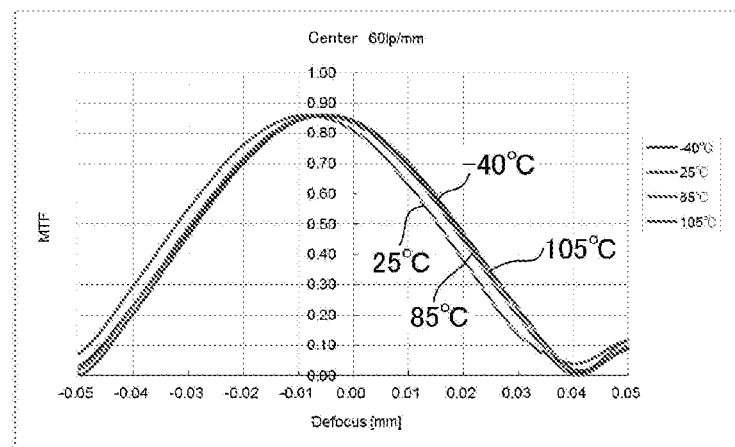
FIGS. 11A, 11B and 11C are graphs showing MTF characteristics of a wide angle lens in accordance with a second embodiment of the present invention.
Figure 11B:
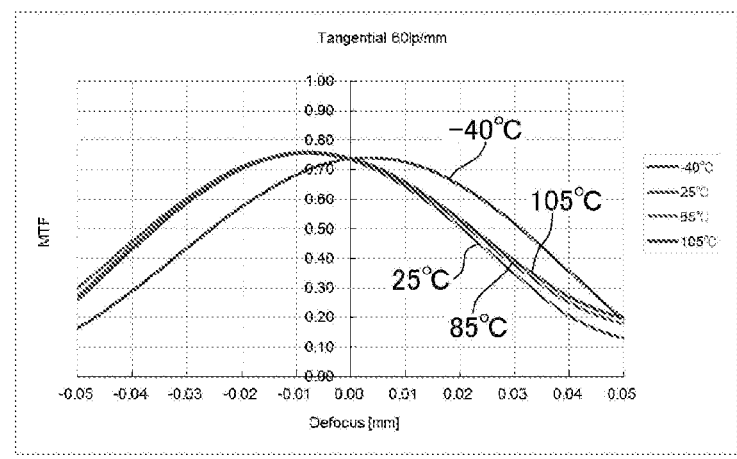
Figure 11C:
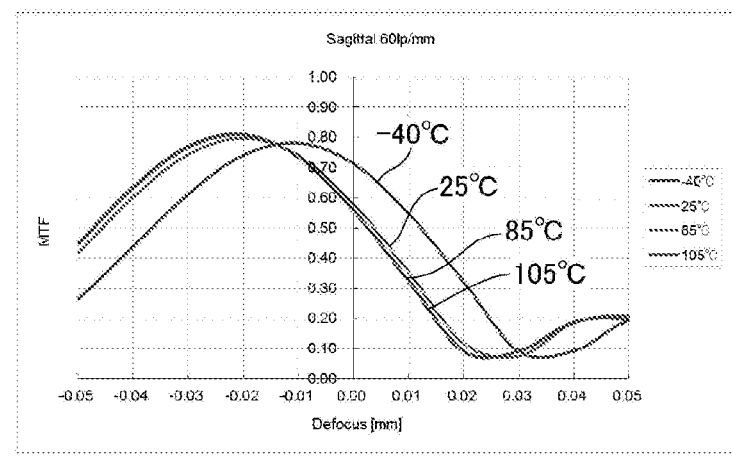
Figure 12:
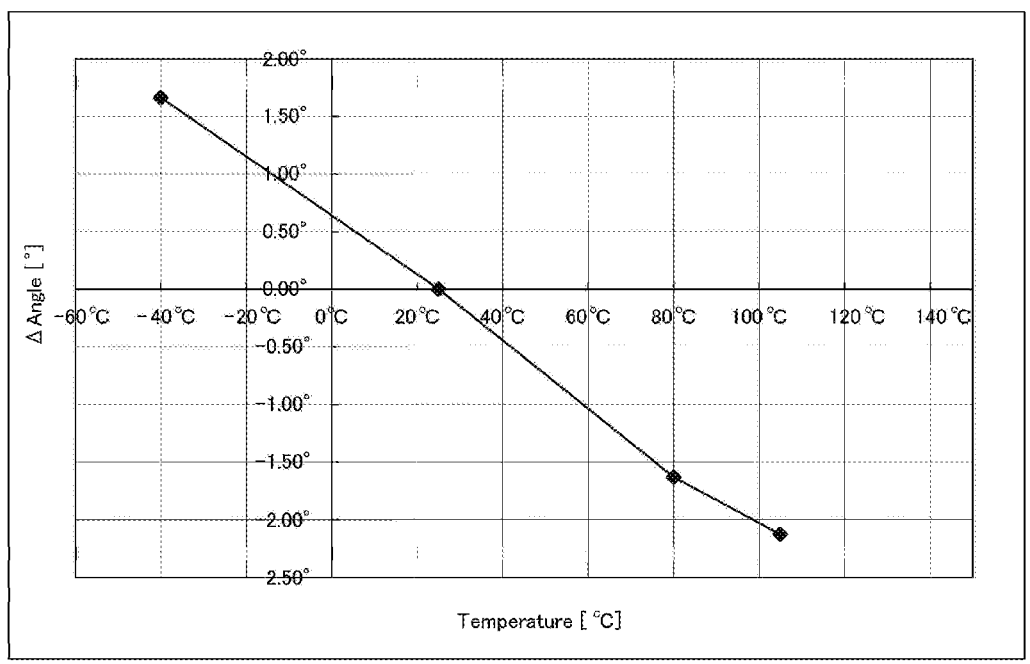
FIG. 12 is a graph showing a viewing angle-temperature characteristic of a wide angle lens in accordance with a second embodiment of the present invention.

FIGS. 11A, 11B and 11C are graphs showing MTF characteristics of a wide angle lens 100 in accordance with a second embodiment of the present invention. FIGS. 11A, 11B and 11C show MTF characteristics in a frequency of 60 lp/mm at temperatures from −40° C. to 105° C. FIG. 12 is a graph showing a viewing angle-temperature characteristic of the wide angle lens 100 in accordance with the second embodiment of the present invention. Table 2 shows lens data of the wide angle lens 100 in accordance with the second embodiment of the present invention. A basic constitution of the wide angle lens 100 in the second embodiment is similar to the first embodiment and thus the constitution of the wide angle lens 100 will be described with reference to FIG. 1.

TABLE 2

| # | Member | Center Curvature Radius | Thickness | Radius | Conical Coefficient K | Linear Expansion Coefficient [×10^−6] | Refractive Index nd | Abbe Number ν d |
|---|---|---|---|---|---|---|---|---|
| 0 |  | Infinity | Infinity | 0.000 |  | 0.0 |  |  |
| 1 | L1 | 12.302 | 1.300 | 5.411 |  | 60.0 | 1.835 | 42.720 |
| 2 |  | 4.120 | 1.690 | 3.262 |  | 26.0 |  |  |
| 3 | L2 | 21.964 | 0.610 | 3.262 | 0 | 62.0 | 1.512 | 56.300 |
| 4 |  | 1.990 | 1.984 | 1.735 | 0 | 62.0 |  |  |
| 5 | L3 | −2.088 | 0.600 | 1.441 | 0 | 62.0 | 1.544 | 56.190 |
| 6 |  | −10.611 | 0.080 | 1.402 | 0 | 62.0 |  |  |
| 7 | L4 | 3.900 | 1.287 | 1.388 | 0 | 62.0 | 1.583 | 30.181 |
| 8 |  | −4.498 | 0.257 | 1.152 | 0 | 62.0 |  |  |
| 9 | Diaphragm | Infinity | 0.240 | 1.012 |  | 26.0 |  |  |
| 10 | L5 | 8.058 | 1.400 | 2.000 |  | 70.0 | 1.697 | 55.460 |
| 11 |  | −4.016 | 0.127 | 2.000 |  | 26.0 |  |  |
| 12 | L6 | 48.775 | 0.600 | 1.474 | 0 | 66.0 | 1.636 | 23.970 |
| 13 | Adhesive | 1.323 | 0.010 | 1.542 | −7.89897E−01 | 60.0 | 1.486 | 56.090 |
| 14 | L7 | 1.323 | 2.515 | 1.545 | −7.89897E−01 | 62.0 | 1.544 | 56.190 |
| 15 |  | −4.323 | 1.000 | 1.714 | 0 | 26.0 |  |  |
| 16 | Filter | Infinity | 0.300 | 1.876 |  | 0.0 | 1.517 | 64.160 |
| 17 |  | Infinity | 1.500 | 1.902 |  | 26.0 |  |  |
| 18 | Cover | Infinity | 0.400 |  |  |  | 1.517 | 64.160 |

TABLE 2-continued

| 19 | Infinity | 0.070 | | |
| 20 | Infinity | | | |

| # | K4 | K6 | K8 | K10 | K12 |
|---|---|---|---|---|---|
| 3 | 3.69247E−03 | −4.89447E−04 | 3.54733E−05 | −6.47121E−07 | |
| 4 | 1.54400E−03 | −1.00842E−03 | 3.06880E−04 | −2.33039E−04 | |
| 5 | 1.24928E−02 | −6.74065E−04 | 1.67789E−03 | | |
| 6 | 9.89879E−03 | 2.50585E−04 | 7.96075E−04 | | |
| 7 | 1.67198E−02 | 3.57873E−03 | 1.11411E−03 | | |
| 8 | 3.29788E−02 | 2.05593E−03 | 3.96451E−03 | | |
| 12 | 4.50630E−03 | −4.03699E−04 | 5.88513E−05 | | |
| 13 | 1.37812E−02 | −8.78518E−03 | 3.14215E−03 | −1.67173E−04 | −1.26885E−05 |
| 14 | 1.37812E−02 | −8.78518E−03 | 3.14215E−03 | −1.67173E−04 | −1.26885E−05 |
| 15 | 1.11651E−02 | 8.48562E−04 | 4.40522E−04 | −2.22409E−04 | 2.74530E−05 |

As shown in FIG. 1 and Table 2, the wide angle lens 100 in this embodiment is, similarly to the first embodiment, comprised of a first lens "L1", a second lens "L2", a third lens "L3", a fourth lens "L4", a diaphragm 60, a fifth lens "L5", a sixth lens "L6" and a seventh lens L7, which are disposed in this order from the object side "La". A flat plate-shaped filter 70, a flat plate-shaped cover 80 and an imaging element 85 are disposed on the image side "Lb" with respect to the seventh lens "L7". In this embodiment, the wide angle lens 100 is a stereoscopic projection type and the maximum distortion when an ideal image height is a reference is designed so as to be 20% or less in an absolute value.

In the wide angle lens 100 in this embodiment, a center curvature radius "R52" of a convex surface (eleventh face 11) on the image side "Lb" of the fifth lens "L5" is −4.016 mm and a focal length "f0" of the entire wide angle lens 100 is 1.442 mm. Therefore, the center curvature radius "R52" and the focal length "f0" satisfy the following first conditional expression:

$(2 \times f0) = 2.8844 \leq |R52| = 4.016 \leq (5 \times f0) = 7.211.$

Further, the center curvature radius "R51" of the convex surface (tenth face 10) on the object side "La" of the fifth lens "L5" is 8.058 mm. Therefore, the center curvature radii "R51" and "R52" satisfy the following second conditional expression:

$|R51| = 8.058 \geq |R52| = 4.016.$

Further, the center thickness "T7" of the seventh lens "L7" is 2.515 mm, and the peripheral thickness "C7" of a light effective area of the convex surface (fourteenth face 14) on the object side "La" of the seventh lens "L7" is 1.25 mm. Therefore, the center thickness "T7" and the peripheral thickness "C7" satisfy the following third conditional expression:

$2 \leq (T7/C7) = 2.012 \leq 3.$

Further, the Abbe number "ν6" of the sixth lens "L6" is 23.970 and the Abbe number "ν7" of the seventh lens "L7" is 56.190. Therefore, the Abbe number "ν6" of the sixth lens "L6" and the Abbe number "ν7" of the seventh lens "L7" satisfy the following fourth conditional expression:

$\nu 6 \leq 30$, and $\nu 7 \geq 50.$

Therefore, the chromatic aberration can be corrected appropriately.

Further, the object-image distance "D" is 15.169 mm and the focal length "f0" of the entire lens system is 1.442 mm. Therefore, the object-image distance "D" and the focal length "f0" of the entire lens system satisfy the following fifth conditional expression:

$8 < D/f0 = 10.519 < 15.$

In this case, the "D/f0" is larger than 8 and thus corrections of the spherical aberration and the distortion aberration can be performed easily. Further, the "D/f0" is less than 15 and thus a dimension (object-image distance) in the optical axis direction of the wide angle lens 100 can be shortened.

Therefore, as shown in FIGS. 11A through 12, the wide angle lens 100 in this embodiment is also obtained with similar effects to the first embodiment. More specifically, as shown in FIGS. 11A through 11C, the wide angle lens 100 in this embodiment is provided with a sufficient resolution and is provided with a sufficient resolution over a wide temperature range from −40° C. to +105° C. Further, as shown in FIG. 12, in the wide angle lens 100 in this embodiment, variations of a vertical viewing angle, a horizontal viewing angle and a diagonal viewing angle are small over a wide temperature range from −40° C. to +105° C.

Third Embodiment

Figure 13:
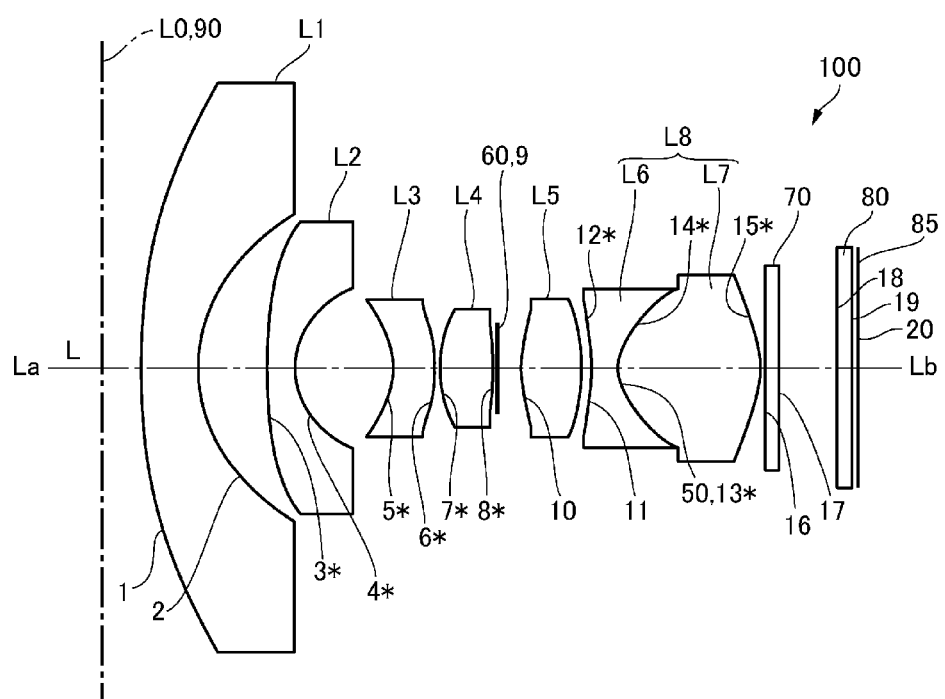
FIG. 13 is an explanatory view showing a constitution of a wide angle lens in accordance with a third embodiment of the present invention.
Figure 14A:
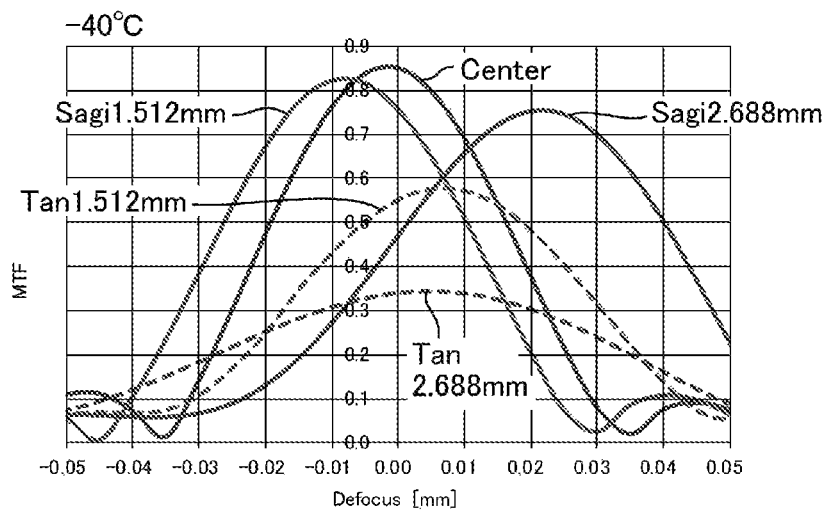
FIGS. 14A, 14B and 14C are graphs showing MTF characteristics at respective temperatures of a wide angle lens in accordance with a third embodiment of the present invention.
Figure 14B:
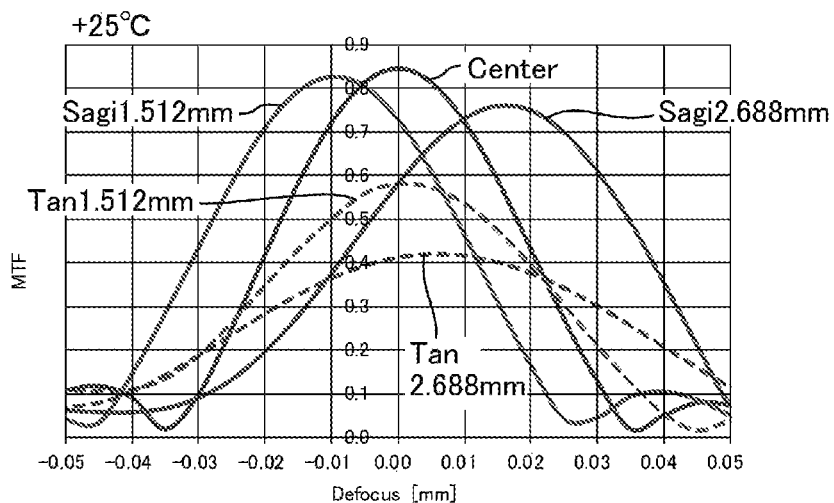
Figure 14C:
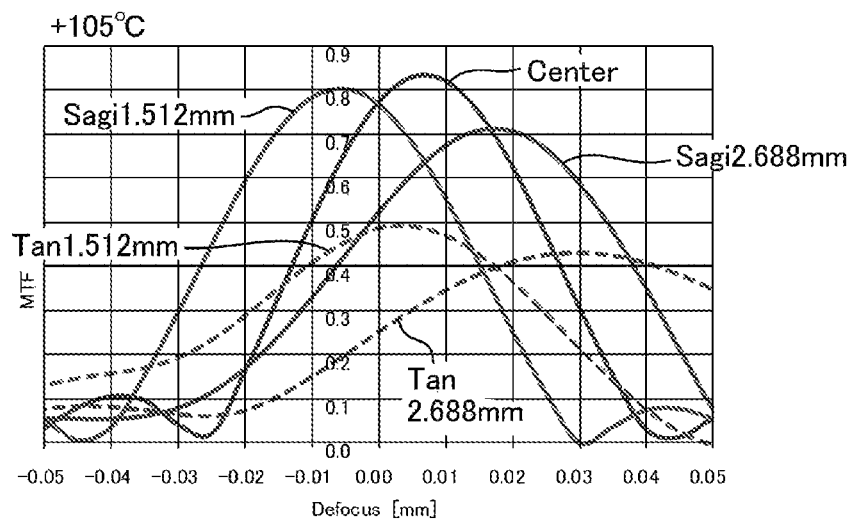
Figure 15A:
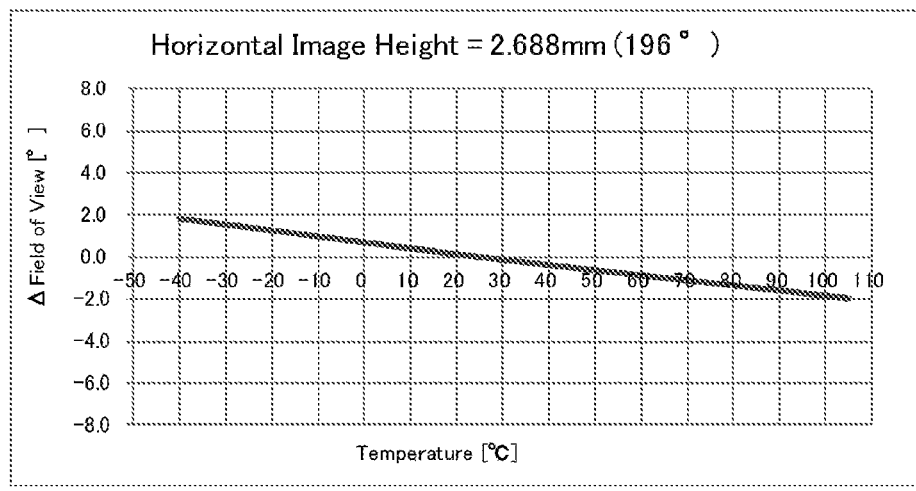
FIGS. 15A and 15B are graphs showing a variation amount of a viewing angle at respective temperatures of a wide angle lens in accordance with a third embodiment of the present invention.
Figure 15B:
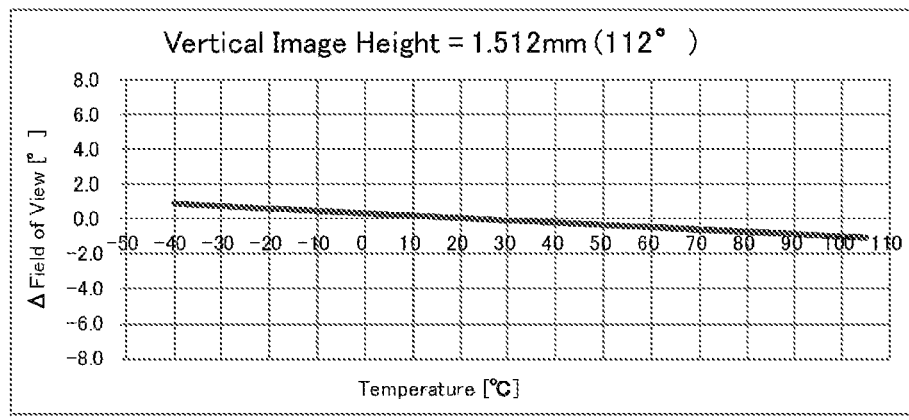

FIG. 13 is an explanatory view showing a constitution of a wide angle lens 100 in accordance with a third embodiment of the present invention. FIGS. 14A, 14B and 14C are graphs showing MTF characteristics at respective temperatures of the wide angle lens 100 in accordance with the third embodiment of the present invention. FIGS. 14A, 14B and 14C show MTF characteristics in a frequency of 80 lp/mm at −40° C., +25° C. and +105° C. Further, FIGS. 14A, 14B and 14C show the MTF characteristics in a tangential (Tan) direction and a sagittal (Sagi) direction at a horizontal image height of 2.688 mm and a vertical image height of 1.512 mm together with the viewing angle center (Center). For example, the MTF characteristic in a tangential (Tan) direction at the horizontal image height of 2.688 mm is indicated by a curved line of the "Tan 2.688 mm". FIGS. 15A and 15B are graphs showing a variation amount of a viewing angle at respective temperatures of the wide angle lens 100 in accordance with the third embodiment of the present invention. FIG. 15A shows a variation amount of a viewing angle at the horizontal image height of 2.688 mm and FIG. 15B shows a variation amount of a viewing angle at the vertical image height of 1.512 mm.

Table 3 shows lens data of the wide angle lens 100 in accordance with the third embodiment of the present invention. A basic constitution of the wide angle lens 100 in the third embodiment is similar to the first embodiment and thus the same reference signs are used in common portions and their detailed descriptions are omitted.

TABLE 3

| # | Member | Center Curvature Radius | Thickness | Radius | Conical Coefficient K | Linear Expansion Coefficient [×10^-6] | Refractive Index nd | Abbe Number ν d |
|---|---|---|---|---|---|---|---|---|
| 0 | | Infinity | Infinity | 0.000 | | 0.0 | | |
| 1 | L1 | 13.520 | 1.300 | 6.676 | | 60.0 | 1.804 | 46.503 |
| 2 | | 4.060 | 1.549 | 3.572 | | 26.0 | | |
| 3 | L2 | 17.735 | 0.600 | 3.445 | 0 | 62.0 | 1.512 | 56.303 |
| 4 | | 2.043 | 2.168 | 1.910 | 0 | 62.0 | | |
| 5 | L3 | −2.239 | 0.910 | 1.681 | 0 | 60.0 | 1.544 | 56.190 |
| 6 | | −3.870 | 0.100 | 1.579 | 0 | 60.0 | | |
| 7 | L4 | 4.733 | 1.200 | 1.437 | 0 | 70.0 | 1.583 | 30.181 |
| 8 | | −7.928 | 0.070 | 1.140 | 0 | 70.0 | | |
| 9 | Diaphragm | Infinity | 0.041 | 1.065 | | 60.0 | | |
| 10 | L5 | 5.810 | 1.370 | 1.490 | | 60.0 | 1.697 | 55.460 |
| 11 | | −4.790 | 0.194 | 1.640 | | 26.0 | | |
| 12 | L6 | −11.365 | 0.600 | 1.653 | 0 | 60.0 | 1.636 | 23.972 |
| 13 | Adhesive | 1.656 | 0.010 | 1.885 | −5.70630E−01 | 60.0 | 1.486 | 56.091 |
| 14 | L7 | 1.66E+00 | 3.150 | 1.907 | −5.70630E−01 | 60.0 | 1.544 | 56.190 |
| 15 | | −3.26E+00 | 0.100 | 2.232 | 0 | 26.0 | | |
| 16 | Filter | Infinity | 0.300 | | | | 1.517 | 64.167 |
| 17 | | Infinity | 1.268 | | | | | |
| 18 | Cover | Infinity | 0.400 | | | | 1.517 | 64.167 |
| 19 | | Infinity | 0.100 | | | | | |
| 20 | | Infinity | | | | | | |

| # | K4 | K6 | K8 | K10 | K12 |
|---|---|---|---|---|---|
| 3 | 2.62938E−03 | −1.00742E−04 | 5.76641E−07 | 4.08623E−07 | |
| 4 | 1.97891E−03 | −2.20252E−03 | 9.94003E−04 | −2.27543E−04 | |
| 5 | −3.57342E−03 | 3.10515E−03 | 1.25888E−03 | −1.18601E−04 | |
| 6 | 1.66339E−03 | 1.88961E−03 | 1.01346E−03 | −6.88478E−05 | |
| 7 | 1.41158E−02 | 4.82545E−04 | 1.17490E−03 | 1.64542E−05 | |
| 8 | 1.71427E−02 | −1.72501E−04 | 1.85787E−03 | −8.06772E−06 | |
| 12 | 1.87909E−03 | −7.56706E−03 | 2.66793E−03 | −3.40064E−04 | |
| 13 | 7.09600E−02 | −5.76700E−02 | 2.02800E−02 | −3.53471E−03 | 2.44895E−04 |
| 14 | 7.09600E−02 | −5.76700E−02 | 2.02800E−02 | −3.53471E−03 | 2.44895E−04 |
| 15 | 1.14165E−02 | −1.71444E−03 | 8.90429E−04 | −1.51674E−04 | 8.92879E−06 |

As shown in FIG. 13 and Table 3, the wide angle lens 100 in this embodiment is, similarly to the first embodiment, comprised of a first lens "L1", a second lens "L2", a third lens "L3", a fourth lens "L4", a diaphragm 60, a fifth lens "L5", a sixth lens "L6" and a seventh lens L7, which are disposed in this order from the object side "La". A flat plate-shaped filter 70, a flat plate-shaped cover glass 80 and an imaging element 85 are disposed on the image side "Lb" with respect to the seventh lens "L7". In this embodiment, the wide angle lens 100 is a stereoscopic projection type and the maximum distortion when an ideal image height is a reference is designed so as to be 20% or less in an absolute value.

In the wide angle lens 100 in this embodiment, the focal length "f0" (effective focal length) of the entire lens system is 1.514, the "F"-value is 2.0, and the object-image distance is 15.9 mm. Further, a vertical viewing angle of the wide angle lens 100 is 112° (image height=3.0 mm), and its horizontal viewing angle is 196° (image height=5.4 mm).

The sixth lens "L6" is, similarly to the first and second embodiments, a negative lens (lens having a negative power) whose concave surface (thirteenth face 13) is directed to the image side "Lb". However, different from the first and second embodiments, a face (twelfth face 12) on the object side "La" of the sixth lens "L6" is a concave surface which is recessed to the image side "Lb". Therefore, the sixth lens "L6" is a biconcave lens whose concave surfaces are directed to the object side "La" and the image side "Lb". The seventh lens "L7" is, similarly to the first and second embodiments, a positive lens (biconvex lens having positive powers) whose convex surfaces (fourteenth face 14 and fifteenth face 15) are directed to the object side "La" and the image side "Lb". Further, each of the concave surface (twelfth face 12) on the object side "La" and the concave surface (thirteenth face 13) on the image side "Lb" of the sixth lens "L6" is an aspherical surface. Each of the convex surface (fourteenth face 14) on the object side "La" and the convex surface (fifteenth face 15) on the image side "Lb" of the seventh lens "L7" is an aspherical surface.

Also in this embodiment, similarly to the first embodiment, the sixth lens "L6" and the seventh lens "L7" constitute a cemented lens "L8" in which the concave surface (thirteenth face 13) on the image side "Lb" of the sixth lens "L6" and the convex surface (fourteenth face 14) on the object side "La" of the seventh lens "L7" are joined to each other with an adhesive 50. Therefore, a face on the object side "La" of the adhesive 50 is the thirteenth face 13 (concave surface on the image side "Lb" of the sixth lens "L6").

The fifth lens "L5" is a glass lens and, among various lens materials, material whose temperature coefficient of a refractive index is varied linearly in a range of −40° C. through +120° C. is used for the fifth lens "L5". The second lens "L2", the third lens "L3", the fourth lens "L4", the sixth lens "L6" and the seventh lens "L7" are plastic lenses made of material such as acrylic-based resin, polycarbonate-based resin or polyolefin-based resin. The first lens "L1" may be either a glass lens or a plastic lens. However, in this embodiment, the first lens "L1" is a glass lens.

Other constitutions are similar to the first and second embodiments. The wide angle lens 100 of seven lenses in six groups constituted as described above is provided with the constitution shown in Table 3 and described below. Therefore, as shown in FIGS. 14A, 14B and 14C, the wide angle lens 100 in this embodiment is provided with a practically sufficient resolution over a temperature range from −40° C. to +105° C. Further, as shown in FIGS. 15A and 15B, a variation of a viewing angle is small over a temperature range from −40° C. to +105° C.

(Detailed Constitution of Lenses)

In the wide angle lens 100, a center curvature radius "R52" of the convex surface (eleventh face 11) on the image side "Lb" of the fifth lens "L5" is −4.790 mm. Further, the focal length "f0" (effective focal length) of the entire wide angle lens 100 is 1.514 mm. Therefore, the center curvature radius "R52" and the focal length "f0" satisfy the following first conditional expression:

$$(2 \times f0) = 3.028 \leq |R52| = 4.79 \leq (5 \times f0) = 7.57.$$

Therefore, an angle formed by the outermost light of a light flux and the convex surface (eleventh face 11) on the image side "Lb" of the fifth lens "L5" is close to a right angle. Accordingly, a moving amount of a focal point when the temperature is varied can be reduced and a variation amount of a viewing angle when the temperature is varied can be reduced. As a result, a stable characteristic can be obtained over a wide temperature range. Further, the center curvature radius "R52" of the convex surface (eleventh face 11) on the image side "Lb" of the fifth lens "L5" made of a glass lens is not less than (2×f0) and thus molding of glass is easily performed and the lens face is easily formed by polishing.

Further, the center curvature radius "R51" of the convex surface (tenth face 10) on the object side "La" of the fifth lens "L5" is 5.810 mm. Therefore, the center curvature radii "R51" and "R52" satisfy the following second conditional expression and thus various aberrations can be corrected appropriately.

$$|R51| = 5.810 \geq |R52| = 4.790.$$

Further, the center thickness "T7" of the seventh lens "L7" is 3.150 mm and the peripheral thickness "C7" of a light effective area of the convex surface (fourteenth face 14) on the object side "La" of the seventh lens "L7" is 1.366 mm. Therefore, the center thickness "T7" and the peripheral thickness "C7" satisfy the following third conditional expression:

$$2 \leq (T7/C7) = 2.306 \leq 3.$$

Accordingly, there may be a case that an effective diameter of the first lens "L1" is required to reduce due to a restriction of an outer diameter dimension of the lens unit and, in this case, even when the radius of curvature of the first lens "L1" is required to make small, the chromatic aberration can be corrected appropriately.

Further, the Abbe number "v6" of the sixth lens "L6" is 23.972 and the Abbe number "v7" of the seventh lens "L7" is 56.190. Therefore, the Abbe number "v6" of the sixth lens "L6" and the Abbe number "v7" of the seventh lens "L7" satisfy the following fourth conditional expression:

$$v6 \leq 30, \text{ and}$$

$$v7 \leq 50.$$

Therefore, the chromatic aberration can be corrected appropriately.

Further, the object-image distance "D" is 15.9 mm and the focal length "f0" of the entire lens system is 1.514 mm. Therefore, the object-image distance "D" and the focal length "f0" of the entire lens system satisfy the following fifth conditional expression:

$$8 < D/f0 = 10.502 < 15.$$

In this case, the "D/f0" is larger than 8 and thus corrections of the spherical aberration and the distortion aberration can be performed easily. Further, the "D/f0" is less than 15 and thus a dimension (object-image distance) in the optical axis direction of the wide angle lens 100 can be shortened.

Other Embodiments

In the embodiments described above, the first lens "L1" is a glass lens. However, the present invention may be applied to a case that the first lens "L1" is a plastic lens.

In the embodiments described above, the center curvature radius "R52" and the focal length "f0" satisfy the above-mentioned first conditional expression. However, it is further preferable to satisfy the following conditional expression.

$$(2 \times f0) \leq |R52| \leq (4 \times f0).$$

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wide angle lens comprising a first lens, a second lens, a third lens, a fourth lens, a diaphragm, a fifth lens, a sixth lens and a seventh lens which are disposed in order from an object side, wherein the first lens is a negative meniscus lens whose convex surface is directed to the object side;

the second lens is a negative meniscus lens whose convex surface is directed to the object side;

the third lens is a negative meniscus lens whose concave surface is directed to the object side;

the fourth lens is a positive lens whose convex surfaces are directed to the object side and an image side;

the fifth lens is a positive lens whose convex surfaces are directed to the object side and the image side;

the sixth lens is a negative lens whose concave surface is directed to the image side;

the seventh lens is a positive lens whose convex surfaces are directed to the object side and the image side;

the fifth lens is a glass lens;

the second lens, the third lens, the fourth lens, the sixth lens and the seventh lens are plastic lenses;

the sixth lens and the seventh lens constitute a cemented lens which is constituted so that an image side face of the sixth lens and an object side face of the seventh lens are joined to each other with an adhesive; and when a center curvature radius on an image side face of the fifth lens is R52 and a focal length of an entire wide angle lens is f0, the center curvature radius R52 and the focal length f0 satisfy the following conditional expression:

$$2 \times f0 \leq |R52| \leq 5 \times f0$$

wherein when a center curvature radius on an object side face of the fifth lens is R51, the center curvature radii R51 and R52 satisfy the following conditional expression:

$$|R51| \geq |R52|$$

wherein when a center thickness of the seventh lens is T7 and a peripheral thickness of a light effective area on an object side face of the seventh lens is C7, the center thickness T7 and the peripheral thickness C7 satisfy the following conditional expression:

$$2 \leq (T7/C7) \leq 3.$$

2. The wide angle lens according to claim 1, wherein the first lens is a glass lens.

3. The wide angle lens according to claim 1, wherein an Abbe number ν6 of the sixth lens and an Abbe number ν7 of the seventh lens satisfy the following conditional expression:

$$\nu 6 \leq 30, \text{ and}$$

$$\nu 7 \leq 50.$$

4. The wide angle lens according to claim 3, wherein an object-image distance D and the focal length f0 satisfy the following conditional expression:

$$8 < D/f0 < 15.$$

5. The wide angle lens according to claim 1, wherein an Abbe number ν6 of the sixth lens and an Abbe number ν7 of the seventh lens satisfy the following conditional expression:

$$\nu 6 \leq 30, \text{ and}$$

$$\nu 7 \geq 50.$$

6. The wide angle lens according to claim 5, wherein an object-image distance D and the focal length f0 satisfy the following conditional expression:

$$8 < D/f0 < 15.$$

7. A wide angle lens comprising a first lens, a second lens, a third lens, a fourth lens, a diaphragm, a fifth lens, a sixth lens and a seventh lens which are disposed in order from an object side, wherein the first lens is a negative meniscus lens whose convex surface is directed to the object side;

the second lens is a negative meniscus lens whose convex surface is directed to the object side;

the third lens is a negative meniscus lens whose concave surface is directed to the object side;

the fourth lens is a positive lens whose convex surfaces are directed to the object side and an image side;

the fifth lens is a positive lens whose convex surfaces are directed to the object side and the image side;

the sixth lens is a negative lens whose concave surface is directed to the image side;

the seventh lens is a positive lens whose convex surfaces are directed to the object side and the image side;

the fifth lens is a glass lens;

the second lens, the third lens, the fourth lens, the sixth lens and the seventh lens are plastic lenses;

the sixth lens and the seventh lens constitute a cemented lens which is constituted so that an image side face of the sixth lens and an object side face of the seventh lens are joined to each other with an adhesive; and when a center curvature radius on an image side face of the fifth lens is R52 and a focal length of an entire wide angle lens is f0, the center curvature radius R52 and the focal length f0 satisfy the following conditional expression:

$$2 \times f0 \leq |R52| \leq 5 \times f0$$

wherein the first lens is a glass lens, wherein when a center thickness of the seventh lens is T7 and a peripheral thickness of a light effective area on an object side face of the seventh lens is C7, the center thickness T7 and the peripheral thickness C7 satisfy the following conditional expression:

$$2 \leq (T7/C7) \leq 3.$$

* * * * *